United States Patent [19]

Harwood, III

[11] Patent Number: 5,652,844
[45] Date of Patent: Jul. 29, 1997

[54] FLEXIBLE PIN CONFIGURATION FOR USE IN A DATA PROCESSING SYSTEM DURING A RESET OPERATION AND METHOD THEREFOR

[75] Inventor: Wallace B. Harwood, III, Austin, Tex.

[73] Assignee: Motorola, Inc., Schaumburg, Ill.

[21] Appl. No.: 494,461

[22] Filed: Jun. 26, 1995

[51] Int. Cl.[6] ................................................. G06F 13/00
[52] U.S. Cl. ............................ 395/284; 395/828; 395/830; 395/834
[58] Field of Search ........................... 395/284, 828, 395/830, 832, 834, 829, 309, 497.01, 182.03, 182.08, 182.21, 775, 800; 371/11.1

[56] References Cited

U.S. PATENT DOCUMENTS

| | | | |
|---|---|---|---|
| 5,428,748 | 6/1995 | Davidson et al. | 395/829 |
| 5,450,353 | 9/1995 | Koike | 365/154 |
| 5,495,196 | 2/1996 | Rothman | 327/143 |
| 5,511,182 | 4/1996 | Le et al. | 395/550 |
| 5,544,342 | 8/1996 | Dean | 395/446 |

*Primary Examiner*—Jack B. Harvey
*Assistant Examiner*—Ario Etienne
*Attorney, Agent, or Firm*—Craig J. Yudell

[57] ABSTRACT

When a data processing system (10) is reset, a configuration value is determined by either an external configuration value provided to a plurality of external integrated circuit pins or an internal value stored in an internal memory of the system (30, 60). If an external configuration value is not provided and if an internal value is not stored in the internal memory, the data processing system provides a default configuration value. The default configuration value is stored in a memory in a system integration unit (20). Configuration data may also be retrieved from the external integrated circuit pins in octal packets. A last bit of each octal packet determines whether a next eight bits of the configuration data is to be retrieved via the plurality of integrated circuit pins or to be retrieved from the default configuration value stored in the system integration unit of the data processing system.

28 Claims, 7 Drawing Sheets

FLEXIBLE PIN CONFIGURATION FOR USE IN A DATA PROCESSING SYSTEM DURING A RESET OPERATION AND METHOD THEREFOR

CROSS REFERENCE TO RELATED APPLICATION

This application is related to our commonly assigned copending patent application concurrently herewith and entitled "RESET CONFIGURATION IN A DATA PROCESSING SYSTEM AND METHOD THEREFOR" by Oded Yishay et al., U.S. Pat. Ser. No. 08/494,664, filed on Jun. 26, 1995.

FIELD OF THE INVENTION

The present invention relates to a data processor having a mask programmed register, in general, and more particularly, to a data processor having a mask programmed register for determining a reset configuration of the data processor.

BACKGROUND OF THE INVENTION

When a data processor is reset, the data processor is configured in a preselected reset configuration which depends on an application being performed by the data processor. Some Data processors which have multiple modes of operation require multiple external integrated circuit pins to determine a reset configuration for a particular application. When a data processor is configured for reset in accordance with logic values driven to external integrated circuit pins, external circuitry is required to drive the logic values onto the integrated circuit pins. Furthermore, the logic values, or configuration data, must be removed from the integrated circuit pins after a reset operation is executed to allow for a normal mode of operation.

Additionally, a configuration for operation of the device after execution of the reset operation should be established during the reset operation since a data processing operation immediately following the reset operation may provide different results in different data processor configurations. For example, a data processing reset/configuration instruction may be required to "tell" the data processor whether the first instruction after reset should be fetched from internal storage within the data processor or from a device external to the data processor. In another example, the instruction may be required to "tell" the data processor whether a mode of operation is a multiplexed mode, where address signals, data signals, and optional control signals are provided on the same bus terminals at different times, or a non-multiplexed mode, where address signals, data signals, and control signals are provided on different bus terminals. When no configuration is specified during a reset operation, the data processor is typically placed in a default configuration.

An external user who desires to override the default configuration of a data processor generally uses an external circuit to drive appropriate reset configuration data onto the external integrated circuit pins of the data processor to configure the data processor in a desired manner. However, providing the external circuit significantly increases overhead costs associated with the data processor and may be prohibitive in some data processing environments. A new solution is required to provide for external reset configuration of a data processor in a cost effective manner. This statement is especially true for those users who require a high volume of data processors because they may be significantly more competitive if they are able to eliminate the external circuit now required to drive reset configuration data onto external integrated circuit pins during a reset operation.

Such users have generally met their volume needs by requiring a manufacturer of the data processor to develop and manufacture a data processor that is tailored to their specifications. This tailored solution also requires the manufacturer to provide a circuit for selectively configuring the data processor to another configuration, even the default configuration, for any number of purposes which may be required for low volume users who cannot afford to require the manufacturer to tailor a data processor tailored to their specifications. As a compromise, the manufacturer may implement a register in an electrically erasable programmable read only memory (EEPROM) which may be programmed to configure the data processor to operate in a certain mode of operation. However, this EEPROM register is generally hard to test, requires a long time to program, and is more expensive to implement. Furthermore, programming the EEPROM register is another manufacturing step which may significantly increase the overhead costs associated with high volume users.

Therefore, there is a need for a data processor which may be easily configured during reset and which minimizes overhead costs of the data processor.

SUMMARY OF THE INVENTION

The previously mentioned needs are fulfilled with the present invention. Accordingly, there is provided, in a first form, a data processing system. The data processing system includes a first memory for storing a first valid bit and a first configuration data value. The first memory provides the first configuration data value as a reset system configuration value when a first drive configuration signal is in a first logic state. A first interface circuit is connected to the first memory for receiving the first valid bit and the first configuration data value and for providing the first drive configuration signal. The first interface circuit provides an internal configuration indication signal and receiving an internal drive configuration signal. The data processing system also includes an external bus interface which selectively communicates an external configuration data value. The external bus interface is connected to the first interface circuit for receiving the internal configuration indication signal. The external bus interface generates the internal drive configuration signal in response to a mode select signal and the internal configuration indication signal. The external bus interface provides an external configuration data value as the reset system configuration value when the mode select signal is in a second logic state.

There is provided, in a second form, a method for configuring a data processor. The method includes the steps of asserting a reset signal and retrieving a mode select signal. A first configuration signal is provided to indicate if a first valid internal configuration value is stored in a first memory circuit. An internal configuration signal is generated in response to the first configuration signal. A first drive external reset configuration signal is generated in response to the mode select signal and the reset signal. An internal drive configuration signal is generated to indicate when the first memory circuit should provide the first valid internal configuration signal as a reset configuration value. The internal drive configuration signal is generated in response to the first configuration signal and the first drive external reset configuration signal. An external bus interface circuit is enabled to provide a first portion of an external data value as a first portion of the reset configuration value when the internal drive configuration signal is in a first logic state.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

FIG. 6 illustrates in flow chart form a series of steps executed by the data processing system of FIG. 1 in accordance with the present invention.

DETAILED DESCRIPTION OF A PREFERRED EMBODIMENT

The present invention provides a data processing system which allows an external user to determine a reset configuration in a flexible manner. When the data processing system is reset, a reset configuration may be determined by either an external configuration value provided to a plurality of external integrated circuit pins or an internal value stored in an internal memory of the data processing system. Additionally, if an external configuration value is not provided and if an internal value is not stored in the internal memory, the data processing system of the present invention provides a default configuration value. The default configuration value is stored in a memory in a system integration unit of the data processing system.

The combined use of a default value, configuration data stored in the internal memory, and the ability to receive configuration data via external integrated circuit pins makes the present invention more cost effective than prior art implementations. For example, high volume users may store configuration data in the internal memory to eliminate external circuitry required to drive configuration data during execution of a reset operation. Therefore, the cost of the data processing system may be significantly reduced.

The present invention also allows the data processor to be selectively configured to the default configuration and any other configuration which may be required for testing purposes or any other operation which requires the default configuration to be overridden. The selectivity embodied by the data processor implementing the present invention is especially useful for low volume users who can not afford the expense of having a manufacturer design a data processor tailored to their specifications. Additionally, the ability of the present invention to selectively configure the data processor is useful for those users who want to use existing data processors as prototypes or for system development.

Additionally, in another unique feature of the present invention, the configuration data is retrieved from the external integrated circuit pins in a grouping of eight bits referred to as an octal packet. A last bit of each of the octal packets determines whether a next eight bits of the configuration data is to be retrieved via the plurality of integrated circuit pins or to be retrieved from the default configuration value stored in the system integration unit of the data processing system. This feature also provides substantial cost savings for users whose application only slightly varies from the default reset configuration. By providing external devices for driving the changed bit values only onto the associated integrated circuit pins, overhead costs associated with providing such external devices are reduced from those of traditional implementations which require external devices for all bits of the configuration data value.

An environment which implements the present invention will subsequently be discussed.

Description of Connectivity

Figure 1:
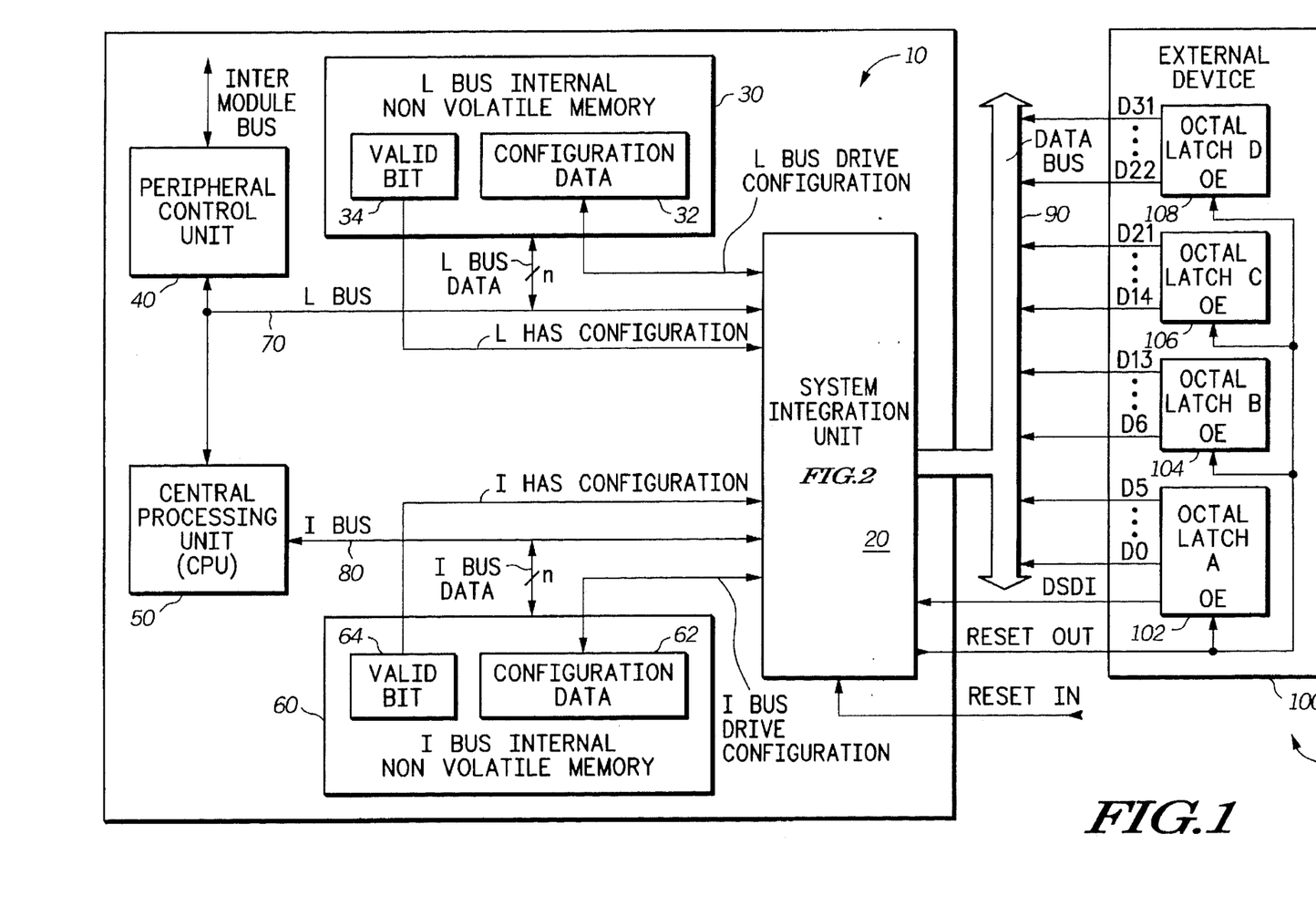
FIG. 1 illustrates in block diagram form a data processing system for implementing the present invention.

FIG. 1 illustrates a data processing system 5 which implements the present invention. Data processing system 5 comprises a data processor 10 and an external device 100. Data processor 10 includes a system integration unit (SIU) 20, an L bus internal non-volatile memory 30, a peripheral control unit 40, a central processing unit (CPU) 50, and an I bus internal non-volatile memory 60. L bus internal non-volatile memory 30 includes a configuration data register 32 and a valid bit 34. I bus internal non-volatile memory 60 includes a configuration data register 62 and a valid bit 64. External device 100 includes an octal latch A 102, an octal latch B 104, an octal latch C 106, and an octal latch D 108.

In data processor 10, an Inter Module bus (IMB) connects peripheral control unit 40 to other data processors and other devices not illustrated herein. Peripheral control unit 40 is coupled to central processing unit 50 and system integration unit 20 via an L Bus 70. L bus internal non-volatile memory 30 is bidirectionally coupled to L Bus 70 to communicate an L Bus Data signal. Valid bit 34 of L bus internal non-volatile memory 30 is coupled to system integration unit 20 via a L Has Configuration signal. Additionally, configuration register 32 is coupled to system integration unit 20 via an L Bus Data signal. CPU 50 is coupled to system integration unit 20 via an I bus 80. I bus internal non-volatile memory 60 is coupled to I bus 80 to receive an I Bus Data signal. Valid bit 64 of I bus internal non-volatile memory 60 is coupled to system integration unit 20 via a I Has Configuration signal. Additionally, configuration register 62 is coupled to system integration unit 20 via an I bus Data signal. It should be noted that all address and data signals in the present implementation of the invention are implemented as multi-bit busses.

System integration unit (SIU) 20 is coupled to external device 100 via a Data bus 90. SIU 20 receives a Reset In signal from an external reset source (not illustrated herein). Additionally, SILT 20 provides a Reset Out signal to an output enable (OE) signal of each of octal latch A 102, octal latch B 104, octal latch C 106, and an octal latch D 108 of external device 100. Octal latch A 102 provides a DSDI (Development Serial Data In) signal to SIU 20. Additionally, octal latch A 102 provides a D0 signal through a D5 signal to SIU 20 via Data bus 90. Octal latch B 104 provides a D6 signal through a D13 signal to SIU 20 via Data bus 90. Similarly, octal latch C 106 provides a D14 signal through a D21 signal and octal latch 108 provides a D22 signal through a D31 signal to SIU 20 via Data bus 90. While FIG. 1 illustrates octal latch D 108 providing ten data signals, a first one of the ten data signals is actually provided by an unused bit of octal latch A 102 and a second one of ten data signals is provided by a single driver circuit implemented on external device 100. In another embodiment of the invention, an extra octal latch may be implemented.

Figure 2:
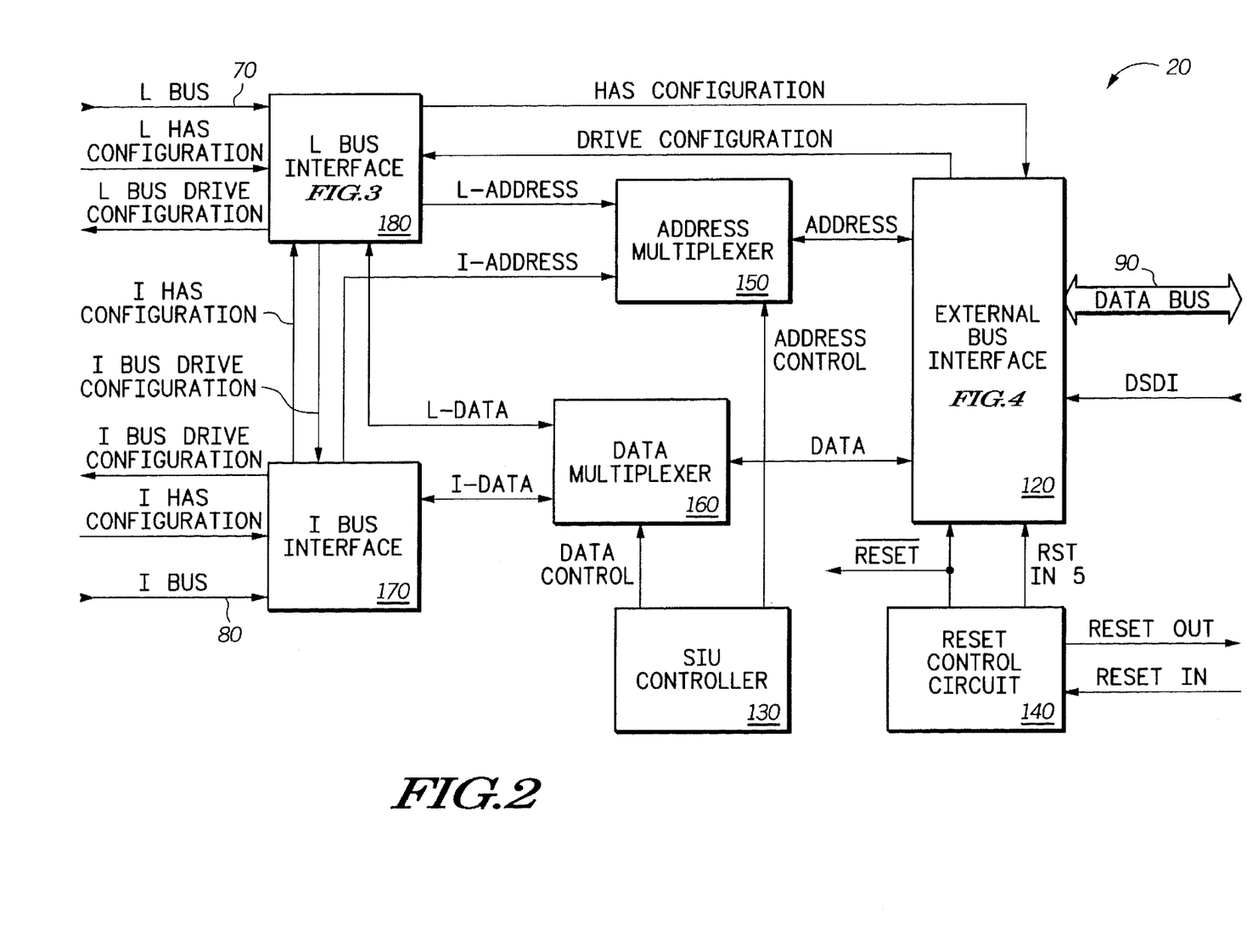
FIG. 2 illustrates in block diagram form a portion of a system integration unit of the data processing system of FIG. 1.

SIU 20 is illustrated in greater detail in FIG. 2. SILT 20 is comprised of an external bus interface 120, a SILT controller 130, a reset control circuit 140, an address multiplexer 150, a data multiplexer 160, an I bus interface 170, and an L bus interface 180. L Bus 70, the L Has Configuration signal, and the L Bus Drive Configuration are communicated with L bus interface 180. L bus interface 180 provides an L Address signal to address multiplexer 150 and an L Data signal to data multiplexer 160. Additionally, L bus interface 180 provides a Has Configuration signal to and receives a Drive Configuration signal from external bus interface 120. I Bus 80, the I Has Configuration signal, and the I Bus Drive Configuration are communicated with I bus interface 170. I bus interface 170 provides an I Address signal to address multiplexer 150 and an I Data signal to data multiplexer 160. SIU controller 130 provides a Data Control signal to data multiplexer 160. I bus interface 170 receives the I Bus Drive Configuration signal from and provides the I Has Configuration signal to L bus interface 180. SILT controller 130 also provides an Address Control signal to address multiplexer 150. Data multiplexer 160 communicates a Data signal with external bus interface 120. Similarly, address multiplexer 150 communicates an Address signal with external bus interface 120.

Reset control circuit 140 receives the Reset In signal and provides the Reset Out signal. Reset control circuit 140 also provides a Rst in 5 signal and a $\overline{\text{Reset}}$ signal to external bus interface 120. External bus interface 120 is coupled to Data bus 90 and also receives the DSDI signal.

Figure 3:
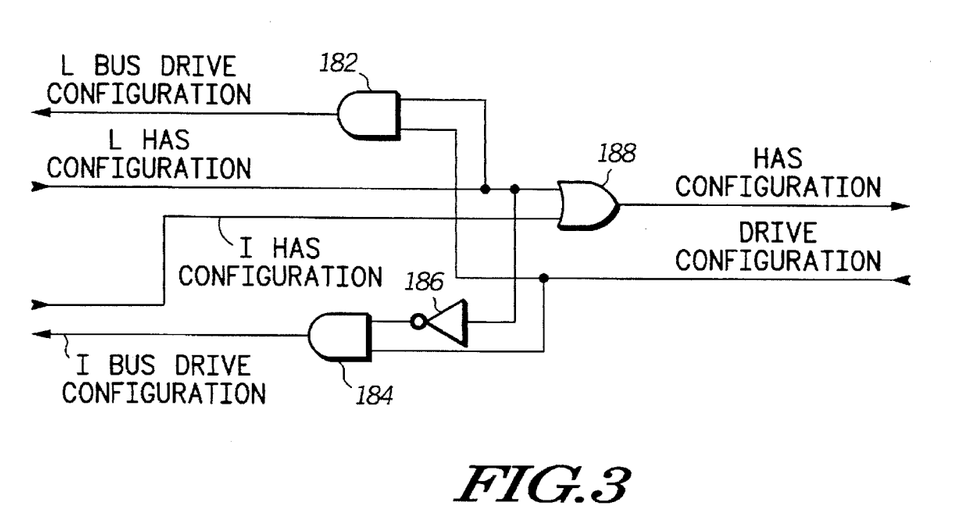
FIG. 3 illustrates in block diagram form an L bus interface of the system integration unit of FIG. 2.

A portion of L bus interface 180 is illustrated in greater detail in FIG. 3. The portion of L bus interface 180 illustrated in FIG. 3 comprises an AND gate 182, an AND gate 184, an inverter 186, and an OR gate 188. The L Has Configuration signal is provided to a first input of AND gate 182, an input of inverter 186, and a first input of OR gate 188. The I Has Configuration signal is provided to a second input of OR gate 188. A Drive Configuration signal is provided to a second input of AND gate 182 and a first input of AND gate 184. The Drive Configuration signal is provided to the portion of L bus interface 180 by external bus interface 120. An output of inverter 186 is coupled to a second input of AND gate 184. An output of AND gate 182 provides the L Bus Drive Configuration signal. Similarly, an output of AND gate 184 provides the I Bus Drive Configuration signal. An output of OR gate 188 provides a Has Configuration signal. The Has Configuration signal is received from of L bus interface 180.

Figure 4:
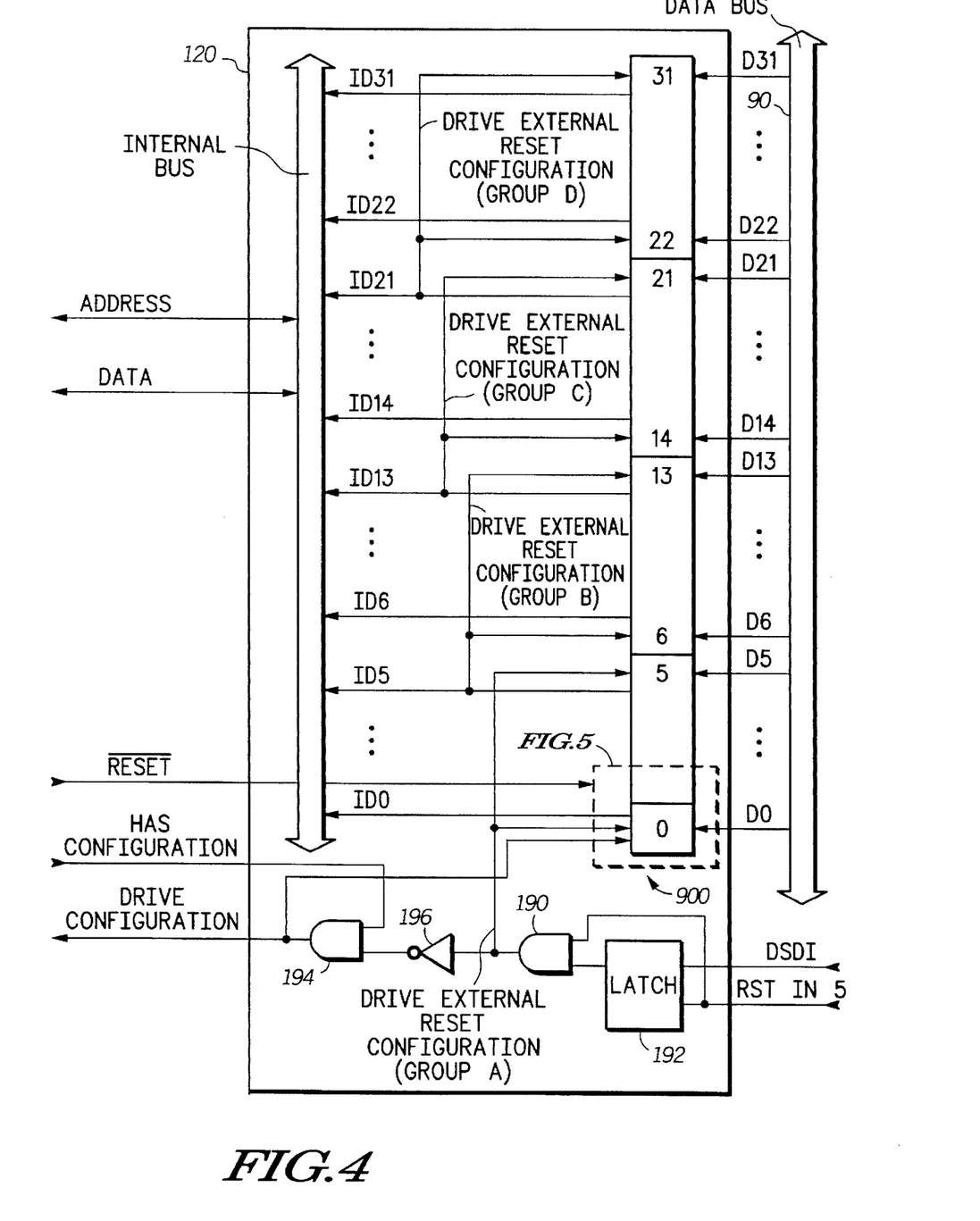
FIG. 4 illustrates in block diagram form an external bus interface of the system integration unit of FIG. 2.

External bus interface 120 is illustrated in greater detail in FIG. 4. External bus interface 120 comprises a plurality of bit slices 900, respectively labeled 0 through 31, an AND gate 190, an latch 192, an AND gate 194, and an inverter 196. Each of the plurality of bit slices 900 receives a data signal from Data bus 90. For example, a bit slice 0 receives a D0 signal from Data bus 90. Similarly, a bit slice 5 receives a D5 signal, a bit slice 6 receives a D6 signal, a bit slice 13 receives a D13 signal, a bit slice 14 receives a D14 signal, a bit slice 21 receives a D21 signal, a bit slice 22 receives a D22 signal, and a bit slice 31 receives a D31 signal from Data bus 90. The DSDI signal is provided to an input of latch 192. A latch enable is provided to latch 192 via the Rst in 5 signal. Latch 192 provides an output to a first input of AND gate 190. The DSDI signal provides a second input to AND gate 190 and to bit slice 900. An output of AND gate 190 is provided to an input of inverter 196. An output of inverter 196 is provided to first input of AND gate 194. The Has Configuration signal is provided to a second input of AND gate 194. An output of AND gate 190 provides the Drive Configuration signal. An output of AND gate 190 provides a Drive External Reset Configuration (Group A) signal to each of a first portion of the plurality of bit slices 0 through 5. Each of the first portion of the plurality of bit slices 0 through 5 provides a respective internal data value to an Internal bus via an ID0 signal through an ID5 signal. The Address and Data signals are provided to a remaining portion of system integration unit 20 via an Internal bus. Note that FIG. 5 illustrates only a portion of logic circuitry which is active during a reset operation.

Furthermore, bit slice 5 provides a Drive External Reset Configuration (Group B) signal to each of a second portion of the plurality of bit slices 6 through 13. Each of the second portion of the plurality of bit slices 6 through 13 provides a respective internal data value to the Internal bus via an ID6 signal through an ID13 signal. Bit slice 13 provides a Drive External Reset Configuration (Group C) signal to each of a third portion of the plurality of bit slices 14 through 21. Each of the third portion of the plurality of bit slices 14 through 21 provides a respective internal data value to the Internal bus via an ID14 signal through an ID21 signal. Bit slice 21 provides a Drive External Reset Configuration (Group D) signal to each of a fourth portion of the plurality of bit slices 22 through 31. Each of the fourth portion of the portion of the plurality of bit slices 22 through 31 provides a respective internal data value to the Internal bus via an ID22 signal through an ID31 signal. Note also that a $\overline{\text{Reset}}$ signal and a Drive Configuration signal are provided to each of the plurality of bit slices 900.

Figure 5:
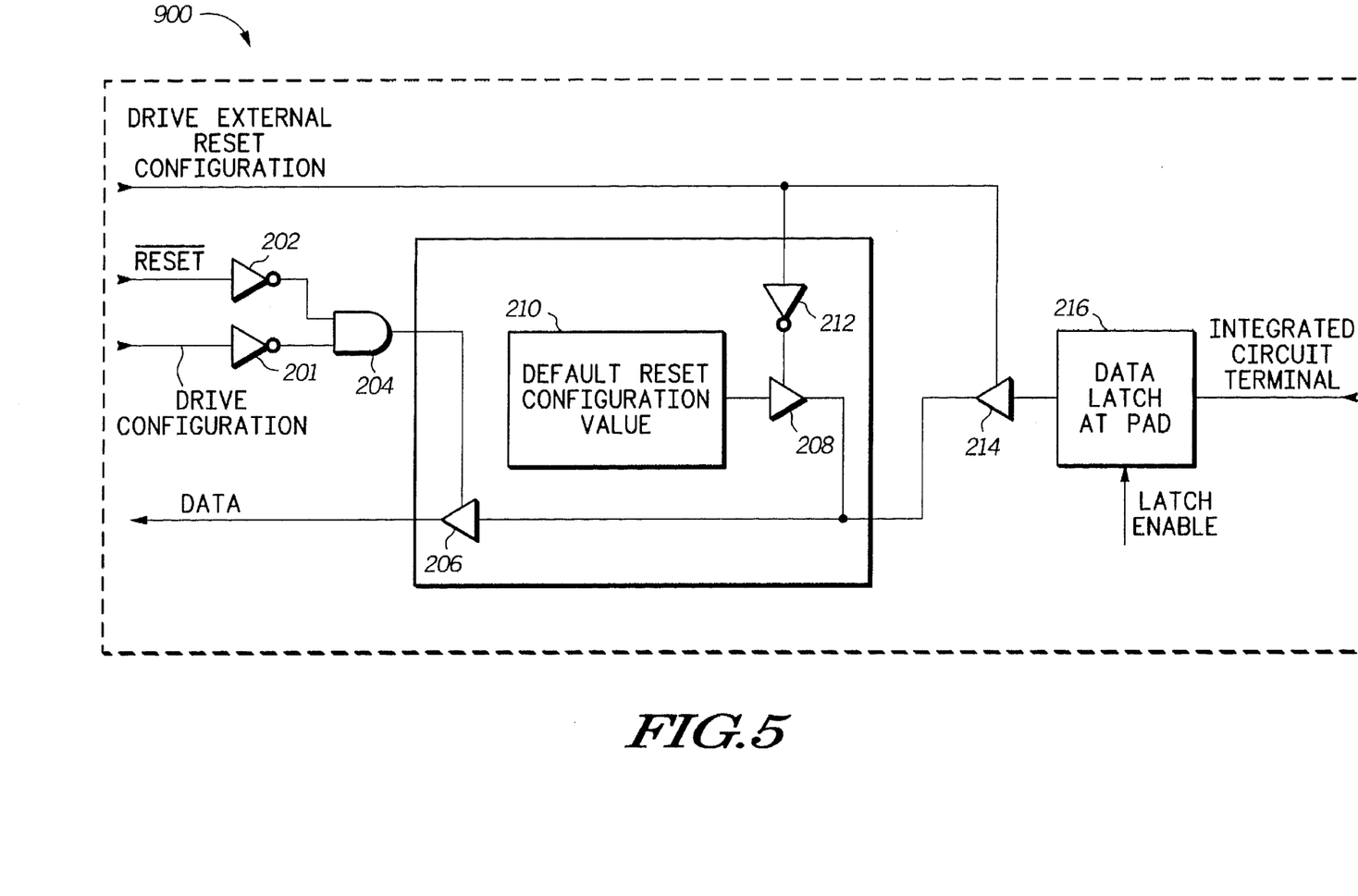
FIG. 5 illustrates a bit slice of the external bus interface of FIG. 4.

One of the plurality of bit slices 900 is illustrated in greater detail in FIG. 5. Each of the plurality of bit slices 900 comprises an inverter 201, an inverter 202, an AND gate 204, a buffer 206, a buffer 208, a default reset configuration value latch 210, an inverter 212, a buffer 214, and a data latch 216. In this embodiment of the invention, inverter 201, inverter 202, AND gate 204, buffer 206, buffer 208, default reset configuration value latch 210, inverter 212, buffer 214 and data latch 216 are implemented on a same integrated circuit substrate.

An integrated circuit terminal provides information to data latch 216. The Latch Enable signal is provided to an enable input of data latch 216. An output of data latch 216 is provided to a first input of buffer 214. Note that buffer 214 is a three-state buffer in this implementation of the invention. A Drive External Reset Configuration signal is provided to an enable input of buffer 214 and an input of inverter 212. An output of buffer 214 is provided to a first input of buffer 206. Note that buffer 206 is a three-state buffer in this implementation of the invention. An output of buffer 208 is also provided to the first input of buffer 206. An output of inverter 212 is provided to an enable input of buffer 208. Note that buffer 208 is a three-state buffer in this implementation of the invention. Default reset configuration value latch 210 provides a data value to an input of buffer 208. Additionally, the Drive Configuration signal is provided to an input of inverter 201. An output of inverter 201 is coupled to a first input of AND gate 204. An output of inverter 202 is coupled to a first input of AND gate 204. The $\overline{\text{Reset}}$ signal is provided to a second input of AND gate 204. An output of AND gate 204 is coupled to an enable input of buffer 206. An output of buffer 206 is provided via a Data signal. The Data signal is one of the ID0 through ID31 signals.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. It should also be noted that a "$" preceding a value indicates that the value is hexadecimal.

Description of Operation

During operation of data processing system 5 illustrated in FIG. 1, data is transferred between data processor 10 and external device 100 via a plurality of integrated circuit pins which form Data bus 90. Operation of data processor 10 is controlled by central processing unit (CPU) 50. CPU 50 has a Harvard architecture which includes separate instruction and load/store busses. In FIG. 1, the instruction bus is labeled I bus 80 and the load/store bus is labeled L bus 70. Additionally, in the present invention, I bus 80 conducts both address and attribute signals provided by CPU 50 and data signals which are bidirectionally communicated with CPU 50. CPU 50 performs an I bus 80 access by providing an address to an address portion of I bus 80 to identify a next instruction to be fetched either from I bus internal non-volatile memory 60 or system integration unit (SIU) 20. CPU 50 also provides a corresponding set of attributes to I bus 80. The attributes define other characteristics of the access such as whether the access is a supervisor or user access, whether the access is a burst cycle, and whether the access is a read or a write operation. Similarly, CPU 50 performs an L bus 70 access by providing an address and attributes to L bus 70. Additionally, CPU 50 bidirectionally communicates data which is to be loaded or stored with L bus internal non-volatile memory 30 and SILT 20.

During general operation, CPU 50 typically accesses instructions from I bus internal non-volatile memory 60 and accesses data from L bus internal non-volatile memory 30. CPU 50 may also access data values from peripheral devices (not illustrated in FIG. 1) via peripheral control unit 40 and the Inter Module bus. Furthermore, if CPU 50 accesses a memory location which is not within an addressing range of either L bus internal non-volatile memory 30 or I bus internal non-volatile memory 60, SIU 20 accesses an external device such as external device 100.

SIU 20 is illustrated in greater detail in FIG. 2 and the connectivity has been previously described. During operation, L bus 70 communicates information with L bus interface 180. Additionally, the L Has Configuration signal is also provided to L bus interface 180 to indicate if configuration data is stored in configuration data register 32 of L bus internal non-volatile memory 30.

(14) L bus interface 180 provides a L Address signal to address multiplexer 150 and provides a L Data signal to data multiplexer 160. Similarly, during operation, I bus 80 communicates information with I bus interface 170. The I Has Configuration signal is also provided to I bus interface 70 to indicate if configuration data is stored in configuration data register 62 of I bus internal non-volatile memory 60. I bus interface 170 provides an I Address signal to address multiplexer 150 and provides a I Data signal to data multiplexer 160. Note that during operation of the present invention, data multiplexer 160 bidirectionally couples the internal data busses during a reset operation.

SIU controller 130 provides a Data Control signal to data multiplexer 160 to indicate whether data provided to external bus interface 120 will be provided by either I bus interface 170 or L bus interface 180. Additionally, the Data Control signal determines whether data provided by external bus interface 120 will be provided to L bus interface 180 or to I bus interface 170. SIU controller 130 also provides an Address Control signal to address multiplexer 150 to indicate whether address information provided to external bus interface 120 will be provided by either I bus interface 170 or L bus interface 180.

Reset control circuit 140 receives the $\overline{\text{Reset In}}$ signal and provides the Reset Out signal, the Latch Enable signal, and the $\overline{\text{Reset}}$ signal. The Latch Enable and $\overline{\text{Reset}}$ signals are both provided to external bus interface 120. The $\overline{\text{Reset}}$ signal is provided to a remaining portion of data processor 10.

While the preceding paragraph describes general operation of data processing system 5, the present invention implicates operation of data processing system 5 during execution of a reset operation. The reset operation may be initiated by receipt of the Reset In signal from a device external to data processor 10 or by receipt of an internal reset signal from an internal source, such as a peripheral device (not illustrated herein) coupled to peripheral control unit 40. In the present invention, an internal reset signal is asserted when there is a loss of clock, a loss of a phase lock loop clock, a software watchdog timeout, an entry of data processor 10 into a checkstop state, or assertion of a JTAG reset request. Of course, in alternate embodiments of the invention, other sources of the internal reset signal may also be implemented.

When either the Reset In signal or the internal reset signal is received, data processor 10 enables reset control circuit 140 of SIU 20 to assert the Reset Out signal to indicate data processor 10 is executing a reset operation. When the Reset Out signal is asserted, data processor 10 waits for five clock cycles and then enables external bus interface 120 to latch data provided via the plurality of integrated circuit terminals. The five clock cycles is provided to allow external devices providing the reset configuration data to the plurality of integrated circuit terminals ample time to provide the configuration data after the Reset Out integrated circuit terminal is asserted. This time period may be shorter or longer depending on an operation to be executed and on a system in which data processor 10 is implemented. Note, in the alternative, the plurality of integrated circuit terminals could be sampled continuously while the Reset Out integrated circuit terminal is asserted. Data processor 10 then reconfigures itself for executing the reset operation and other subsequent operations. In the present invention, data necessary for determining the configuration of data processor 10 after the assertion of the Reset In signal or the internal reset signal is provided by either configuration data register 32 of L bus internal non-volatile memory 30, configuration data register 62 of I bus internal non-volatile memory 62, a default configuration value stored in SIU 20, or an external configuration value provided by external device 100.

During operation of the present invention, a user of data processing system 10 may store configuration data in configuration data register 32 of L bus internal non-volatile memory 30 prior to assertion of either the Reset In signal or the internal reset signal. When configuration data for use during a reset operation is stored in configuration data register 32, valid bit 34 is set and the L Has Configuration signal is asserted. When L bus internal non-volatile memory 30 receives a negated L Bus Drive Configuration signal from L bus interface 180 of SIU 20, L bus internal non-volatile memory 30 provides the data stored in configuration data register 32 to a remaining portion of data processor 10 via L bus 70. Similarly, if the L Bus Drive Configuration signal is asserted, L bus interface 180 of SIU 20, the configuration data is provided to a remaining portion of SIU 20 via the L-Data signal (of FIG. 2).

Similarly, the user may store configuration data in data register 62 of I bus internal non-volatile memory 60 prior to assertion of either the Reset In signal or the internal reset signal. When configuration data for use during the reset operation is stored in configuration register 62, valid bit 64 is set and the I Has Configuration signal is asserted. When I bus internal non-volatile memory 60 receives a negated I Bus Drive Configuration signal from I bus interface 170 of SIU 20, I bus internal non-volatile memory 60 provides the data stored in configuration data register 62 to a remaining portion of data processor 10 via I bus 80. Similarly, if the I Bus Drive Configuration signal is asserted, I bus interface 170 of SIU 20, the configuration data is provided to a remaining portion of SIU 20 via the I-Data signal (of FIG. 2).

Additionally, peripheral control unit 40 of data processor 10 drives data onto the Inter-Module Bus during the reset operation. Additionally, in an alternate embodiment of the invention, peripheral control unit 40 may provide the L Has Configuration and the L Bus Drive Configuration signals onto the Inter-Module Bus such that peripheral control unit 40 functions similarly to L bus interface 180. Such a configuration would allow an EEPROM (electrically erasable read only memory) on the Inter-Module bus to provide a configuration word.

If configuration data is not stored in either configuration data register 32 or configuration data register 62 or if no internal non-volatile memory exists on data processing system 10, configuration data is provided by either a default value stored in SIU 20 or by an external configuration value provided by an external device 100. Note that if no non-volatile memory exists on data processing system 10, the I Has Configuration and/or the L Has Configuration signal are tied to a logic low value and effectively negated. The default value is accessed when the DSDI signal is negated and the external configuration value is accessed when the DSDI signal is asserted. It should be noted that during the reset operation, the DSDI signal functions to select a mode and not to drive serial data in from an external device. Therefore, another external integrated circuit terminal may also implement the same function. Furthermore, in a uniquely flexible implementation of the present invention, only portions of the external configuration value may be accessed and a remaining portion of the configuration data is provided by a corresponding portion of the default value. Operation of data processing system 5 will now be discussed in greater detail.

Assume in a first operation, a user stores a configuration data value in configuration data register 32 of L bus internal non-volatile memory 30. Additionally, valid bit 34 is asserted to indicate that the configuration data value stored in configuration data register 32 is to be used to configure data processor 10 during a reset operation. Both the configuration data value and the valid bit are written by a user and are respectively stored in configuration data register 32 and valid bit 34 prior to execution of the reset operation.

When valid bit 34 is asserted, the L Has Configuration signal is asserted and provided to L bus interface 180 of SIU 20. When valid bit 64 is asserted, the I Has Configuration signal is asserted. The I Has Configuration signal is provided to I bus interface 170 of SIU 20. I bus interface 170 then passes the I Has Configuration signal to L bus interface 180. Note that in this embodiment of the invention, each of the L Has Configuration and I Has Configuration signals are established before the reset operation is executed. In contrast, the L Bus Drive Configuration and the I Bus Drive Configuration signals are modified while the reset operation is executed.

When each of the Drive Configuration signal, the L Has Configuration signal, and the I Has configuration signal are provided to L bus interface 180, L bus interface 180 determines whether configuration data should be provided by data stored in L bus internal non-volatile memory 30, I bus internal non-volatile memory 60, or SIU 20. L bus interface 180 logically combines the L Has Configuration signal and the I Has Configuration signal using OR gate 188 to generate the Has Configuration signal. The Has Configuration signal is subsequently provided to external bus interface 120. When asserted, the Has Configuration signal indicates that configuration data for configuring data processor 10 may be provided via either L bus internal non-volatile memory 30 or I bus internal non-volatile memory 60. If the DSDI signal is negated to indicate that data should not be retrieved from an external memory such as external device 100, the Drive Configuration signal is asserted and provided to L bus interface 180. External bus interface 120 also provides the Drive Configuration signal to L bus interface 180.

If the Drive Configuration signal is asserted and the L Has Configuration signal is asserted to indicate that the configuration data may be provided by L bus internal non-volatile memory 30, AND gate 182 asserts the L Bus Drive Configuration signal. Additionally, the logic circuitry comprising L bus interface 180 illustrated in FIG. 3 ensures that when the L Has Configuration signal is asserted, the I Bus Drive Configuration signal can not be asserted. Therefore, a case in which both I bus 80 and L bus 70 are asserted will never arise.

When an asserted L Bus Drive Configuration signal is provided to L bus internal non-volatile memory 30, configuration data register 32 provides the configuration data stored therein to L Bus 70. L Bus 70 subsequently provides the configuration word to all internal busses while the Reset Out signal remains asserted. The configuration word is subsequently used by all peripherals and elements of data processor 10 to establish operation after the reset operation is executed.

Assume in a second operation, a user stores a configuration data value in configuration data register 62 of I bus internal non-volatile memory 60. Additionally, valid bit 64 is asserted to indicate that the configuration data value stored in configuration data register 62 is to be used to configure data processor 10 during the reset operation. Both the configuration data value and the valid bit are written by the user and are respectively stored in configuration data register 62 and valid bit 64 prior to execution of the reset operation.

When valid bit 64 is asserted, the I Has Configuration signal is asserted and provided to I bus interface 170 of SIU 20. I bus interface 170 passes the I Has Configuration signal to L bus interface 180. Additionally, valid bit 34 and the L Has Configuration signal in a corresponding logic state are provided to L bus interface 180. Furthermore, external bus interface 120 provides the Drive Configuration signal to L bus interface 180.

When each of the Drive Configuration signal, the L Has Configuration signal, and the I Has configuration signal are provided to L bus interface 180, L bus interface 180 determines whether configuration data should be provided by data stored in L bus internal non-volatile memory 30, I bus internal non-volatile memory 60, or SIU 20. L bus interface 180 logically combines the L Has Configuration signal and the I Has Configuration signal using OR gate 188 to generate the Has Configuration signal. When asserted, the Has Configuration signal indicates that configuration data for configuring data processor 10 may be provided via either L bus internal non-volatile memory 30 or I bus internal non-volatile memory 60. If the DSDI signal is negated to indicate that data should not be retrieved from an external memory such as external device 100, the Drive Configuration signal is asserted and provided to L bus interface 180.

If the Drive Configuration signal is asserted and the L Has Configuration signal is negated to indicate that the configuration data will not be provided by L bus internal non-volatile memory 30, AND gate 182 maintains a negated state of the L Bus Drive Configuration signal. Additionally, the L Has Configuration signal is inverted by inverter 186 to provided an asserted input to AND gate 184. Therefore, if the I Has Configuration signal is asserted, the I Bus Drive Configuration signal is asserted to indicate that the configuration data should be provided by I bus internal non-volatile memory 60.

When an asserted I Bus Drive Configuration signal is provided to I bus internal non-volatile memory 60, configuration data register 62 provides the configuration data stored therein to I Bus 80. I Bus 80 subsequently provides the configuration word to all internal busses while the Reset Out signal remains asserted. The configuration word is subsequently used by all peripherals and elements of data processor 10 to configure for operation after the reset operation is executed.

The first two operations described above describe operations in which configuration data is provided by memory circuits internal to data processor 10. It should be noted that in the first two operations, L bus internal non-volatile memory 30 and I bus internal non-volatile memory 60 may be implemented as RAM (random access memory), ROM (read only memory), EEPROM (electrically erasable ROM), or flash EEPROM.

In a third operation, assume configuration data is provided by a default value stored in external bus interface 120. The configuration data is provided by the default value when either no internal non-volatile memories are implemented on data processing system 10 or no configuration data values are stored in configuration data register 32 of L bus internal non-volatile memory 30 or in configuration data register 62 of I bus internal non-volatile memory 60, and when an external configuration data value is not provided by an external device such as external device 100. If L bus internal non-volatile memory 30 is not implemented, the L Has Configuration signal is negated at an input of L bus interface 180. Similarly, when no configuration data values are stored configuration data register 62 of I bus internal non-volatile memory 60, no internal non-volatile memories are implemented in the data processor, and an external configuration data value is not provided by an external device such as external device 100. If I bus internal non-volatile memory 60 is not implemented, the I Has Configuration signal is negated at an input of I bus interface 170. and when an external configuration data value is not provided by an external device such as external device 100. In the third operation, assume either a Reset In signal is asserted by an external device (not illustrated in FIG. 2) or an internal reset signal is asserted by a peripheral device of data processor 10. Additionally, assume that the DSDI signal provided by an external device (not illustrated in FIG. 2) is negated to indicate that the configuration data must be provided by a source internal to data processor 10.

For a more detailed description of data processor 10's execution of the third operation, refer to external bus interface 120 illustrated in FIG. 4. The DSDI signal input via a DSDI integrated circuit terminal (not illustrated in FIG. 4) is provided to latch 192. When the Rst in 5 signal is asserted to indicate that a reset signal was asserted five clock periods before, latch 192 provides the DSDI signal to AND gate 190. As the DSDI signal is negated in the third operation, AND gate 190 provides the Drive External Reset Configuration (Group A) signal at a logic low value. The Drive External Reset Configuration (Group A) signal is provided to inverter 196. Inverter 196 subsequently provides an input to AND gate 194. Furthermore, in the third operation, the Has Configuration signal provided by L bus interface 180 is negated because neither L bus internal non-volatile memory 30 nor I bus internal non-volatile memory 60 stores the configuration data value. Therefore, the Drive Configuration signal provided by AND gate 194 is negated and does not enable either L bus internal non-volatile memory 30 or I bus internal non-volatile memory 60 to output the configuration data. Together, the output of inverter 196 and the Has Configuration signal enable AND gate 194 to negate the Drive Configuration signal.

The Drive External Reset Configuration (Group A) signal is provided to each of a first portion of bits of data input values provided by Data bus 90. The first portion of bits includes data bits D0 through D5. The second portion of bits includes data bits D6 through D13. The third portion of bits includes data bits D14 through D21 and the fourth portion of bits includes data bits D22 through D31. Each of the bits described above is configured in a manner illustrated in FIG. 4. For ease of understanding, a following discussion will refer to the data bit illustrated in FIG. 4 as data bit D0.

Therefore, when the Drive External Reset Configuration (Group A) signal is provided to data bit D0, inverter 212 inverts the signal to enable buffer 208 to provide a first data bit stored in default reset configuration value latch 210 to buffer 206. Buffer 206 is enabled to provide the first data bit to an internal bus via the Data signal (ID0) when AND gate 204 provides an asserted output in response to the Drive Configuration signal and the $\overline{Reset}$ signal. Additionally, because the Drive External Reset Configuration signal is a logic zero value, buffer 214 is not enabled to provide data stored in data latch 216 to external bus interface 120 of data processor 10. Because the Drive External Reset Configuration (Group A) signal is provided to each of data bits D0 through D5, data stored in a default reset configuration value latch of each of data bits D0 through D5 is provided as a corresponding bit of a default data configuration value. Note that in the present embodiment of the invention, the default reset configuration value latch is implemented as a non-volatile memory.

In the present embodiment of the invention, a last bit of a preceding portion of data bits is provided to a next portion of data bits as the Drive External Reset Configuration signal. For example, data bit D5 of the first portion of data bits is provided as the Drive External Reset Configuration (Group B) signal to each of data bits D6 through D13. Additionally, data bit D13 of the second portion of data bits is provided as the Drive External Reset Configuration (Group C) signal to each of data bits D14 through D21. As well, data bit D21 of the third portion of data bits is provided as the Drive External Reset Configuration (Group D) signal to each of data bits D22 through D31.

When data processor 10 is executing the third operation, the configuration data is provided by default configuration data stored in the plurality of default reset configuration value latches as illustrated by latch 210 of FIG. 5. Because the default configuration data must be retrieved from each of the plurality of reset configuration value latches for each of the plurality of data bits, each of data bits D5, D13, and D21 should provide a logic low value. Therefore, when a Drive External Reset Configuration signal corresponding to each of data bits D5, D13, and D21 is provided to a data bit such as that illustrated in FIG. 5, inverter 212 inverts the signal to enable buffer 208 to provide a data bit stored in default reset configuration value latch 210 to buffer 206. Buffer 206 is enabled to provide the first data bit to an internal bus via the Data signal when AND gate 204 provides an asserted output in response to the Drive Configuration signal and the $\overline{\text{Reset}}$ signal.

Additionally, because the Drive External Reset Configuration signal is a logic zero value, buffer 214 is not enabled to provide data stored in data latch 216 to external bus interface 120 of data processor 10. Because the Drive External Reset Configuration signal is provided to each of the plurality of data bits, data stored in a default reset configuration value latch of each of the data bits is provided as a corresponding bit of a default data configuration value. Note that in the present embodiment of the invention, the default reset configuration value latch is implemented as a mask programmable read only memory (ROM).

The third operation enables data processor 10 to use a default configuration data value stored in external bus interface 120 during a reset operation when a user does not store a default configuration value in either configuration data register 32 of L bus internal non-volatile memory 30 or configuration data register 62 of I bus internal non-volatile memory 60 and when the user does not provide an external default configuration value from external device 100. The use of the default configuration value is especially useful for users who use a high volume of data processors and for whom the circuitry required to provided data values externally may require prohibitive overhead costs. Because the default configuration value may be stored in non-volatile memory during a manufacturing process, the costs associated with providing external devices will be alleviated or substantially reduced for high volume users.

In a fourth operation, data processor 10 provides another flexible option for allowing a user to provide an external configuration data value via an external device such as external device 100. When a user desires to provide the external configuration data value, the user retrieves an external configuration data value or a portion of the external configuration data value from external device 100. In external device 100, octal latch A 102 stores a data value corresponding to data bit 0 (DO) through data bit 5 (D5). Similarly, octal latch B 104 stores a data value corresponding to data bit 6 (D6) through data bit 13 (D13). As well, octal latch C 106 stores a data value corresponding to data bit 14 (D14) through data bit 21 (D21) and octal latch D 108 stores a data value corresponding to data bit 22 (D22) through data bit 31 (D31).

When the Reset Out signal is asserted by reset control circuit 140 of system integration unit 20 to indicate data processor 10 is executing a reset operation, the output enable (OE) inputs of each of octal latch A 102, octal latch B 104, octal latch C 106, and octal latch D 108 are also asserted. When the OE input of octal latch A 102 is asserted, octal latch A 102 provides the DSDI signal to system integration unit 20. Furthermore, when the OE input is asserted, octal latch A 102 provides the D0 through D5 signals to Data bus 90. Similarly, when the OE input of octal latch B 104 is asserted, octal latch B 104 provides the D6 through D13 signals to Data bus 90. Additionally, when the OE inputs of each of octal latch C 106 and octal latch D 108 are asserted, octal latch C 106 provides the D14 through D21 signals and octal latch D 108 provides the D22 through D31 signals to Data bus 90.

When the DSDI signal is asserted to indicate that external device 100 is providing the external configuration data value for use during the reset operation, the DSDI signal is latched in latch 192. When the Rst in 5 signal is asserted, the DSDI signal is provided to AND gate 190. AND gate 190 subsequently provides an asserted Drive External Reset Configuration (Group A) signal to the first plurality of bit slices 900 and to inverter 196. Subsequently, AND gate 194 provides a negated Drive Configuration signal. When the Drive Configuration signal is negated, neither L bus internal non-volatile memory 30 nor I bus internal non-volatile memory 60 are enabled to provide configuration data which may be stored therein respectively.

When the Drive External Reset Configuration (Group A) is asserted and provided to the first portion of data bits D0 through D5, buffer 208 is disabled and does not provide the default reset configuration value stored in latch 210. Additionally, buffer 214 is enabled to provide data latched in data latch 216. When buffer 214 is thus enabled, data which is latched in data latch 216 is provided to buffer 206. Furthermore, AND gate 204 provides an asserted signal to buffer 206. Buffer 206 subsequently provides the data to Data bus 90 via the Data signal. When the DSDI signal and the Drive External Reset Configuration (Group A) signals are asserted, each of data bits D0 through D5 are provided to system integration unit 20 via Data bus 90. Thus, bits D0 through D5 are provided as data bits zero through five of the external configuration data value.

If data bit D5 is asserted, the Drive External Reset Configuration (Group B) signal is asserted and data bits D6 through D13 are retrieved from octal latch B 104 of external device 100. When the Drive External Reset Configuration (Group B) is asserted and provided to the second portion of data bits D6 through D13, OR gate 204 provides an asserted signal to both buffer 206 and buffer 214. When buffer 214 is thus enabled, data which is latched in data latch 216 is provided to buffer 206. Buffer 206 subsequently provides the data to Data bus 90 via the Data signal. When the DSDI signal and the Drive External Reset Configuration (Group B) signals are asserted, each of data bits D6 through D13 are provided to system integration unit 20 via Data bus 90. Thus, bits D6 through D13 are provided as data bits six through thirteen of the external configuration data value.

However, if data bit D5 is negated, the Drive External Reset Configuration (Group B) is negated. When the Drive External Reset Configuration (Group B) signal is provided to each of data bits D6 through D13, inverter 212 inverts the signal to enable buffer 208 to provide a corresponding data bit stored in default reset configuration value latch 210 to buffer 206. Buffer 206 is enabled to provide the corresponding data bit to an internal bus via the Data signal (ID6 through ID13) when AND gate 204 provides an asserted output in response to the $\overline{\text{Reset}}$ and Drive Configuration signals. Additionally, because the Drive External Reset Configuration signal is a logic zero value, buffer 214 is not enabled to provide data stored in data latch 216 to external bus interface 120 of data processor 10. Because the Drive External Reset Configuration (Group B) signal is provided to each of data bits D6 through D13, data stored in a default reset configuration value latch of each of data bits D6 through D13 is provided as a corresponding bit of a default data configuration value. Note that in the present embodiment of the invention, the default reset configuration value latch is implemented as a non-volatile memory.

In the present embodiment of the invention, when a portion of the configuration data value is provided by the default data configuration value stored in system integration unit 10, all subsequent portions of the data configuration value are also provided by the default data configuration value in system integration unit 10. Note that in an alternate embodiment of the present invention, subsequent portions of the data configuration value may be provided by an external device such as external device 100. However, in the present embodiment of the invention, if data bit D5 indicates that the data configuration value are provided by the default data configuration value stored in SIU 20, each of bits D14 through D31 should be provided by the default data configuration value stored in SIU 20 in a manner previously described.

Additionally, if data bits D5 through D13 are provided by octal latch B 104 of external device 100, a logic level of data bit D13 determines whether a next portion of data bits, D14 through D21, are provided by octal latch C 106 or by a default value stored in system integration unit 20. Assume that data bit D13 is asserted; therefore, the Drive External Reset Configuration (Group C) signal is asserted and data bits D14 through D21 are retrieved from octal latch C 106 of external device 100. When the Drive External Reset Configuration (Group C) is asserted and provided to the third portion of data bits D14 through D21, OR gate 204 provides an asserted signal to both buffer 206. When buffer 214 is thus enabled, data which is latched in data latch 216 is provided to buffer 206. Buffer 206 subsequently provides the data to Data bus 90 via the Data signal. When the DSDI signal and the Drive External Reset Configuration (Group C) signals are asserted, each of data bits D14 through D21 are provided to system integration unit 20 via Data bus 90. Thus, bits D14 through D21 are provided as data bits fourteen through twenty-one of the external configuration data value.

As previously explained, if data bit D13 is negated, the Drive External Reset Configuration (Group C) is negated. When the Drive External Reset Configuration (Group C) signal is provided to each of data bits D14 through D21, inverter 212 inverts the signal to enable buffer 208 to provide a corresponding data bit stored in default reset configuration value latch 210 to buffer 206. Buffer 206 is enabled to provide the corresponding data bit to an internal bus via the Data signal (ID14 through ID21) when AND gate 204 provides an asserted output in response to $\overline{\text{Reset}}$ and Drive Configuration signals. Additionally, because the Drive External Reset Configuration signal is a logic zero value, buffer 214 is not enabled to provide data stored in data latch 216 to external bus interface 120 of data processor 10. Because the Drive External Reset Configuration (Group C) signal is provided to each of data bits D14 through D21, data stored in a default reset configuration value latch of each of data bits D14 through D21 is provided as a corresponding bit of a default data configuration value. Note that in the present embodiment of the invention, the default reset configuration value latch is implemented as a non-volatile memory. Additionally, in the present embodiment of the invention, if data bit D13 indicates that the data configuration value should be provided by the default data configuration value stored in SIU 20, each of bits D22 through D31 should be provided by the default data configuration value stored in SILT 20 in a manner previously described.

Additionally, if data bits D14 through D21 are provided by octal latch C 106 of external device 100, a logic level of data bit D21 determines whether a next portion of data bits, D22 through D31, are provided by octal latch D 108 or by a default value stored in system integration unit 20. Assume that data bit D21 is asserted; therefore, the Drive External Reset Configuration (Group D) signal is asserted and data bits D22 through D31 are retrieved from octal latch D 108 of external device 100. When the Drive External Reset Configuration (Group D) is asserted and provided to the third portion of data bits D22 through D31, AND gate 204 provides an asserted signal to both buffer 206. When buffer 214 is thus enabled, data which is latched in data latch 216 is provided to buffer 206. Buffer 206 subsequently provides the data to Data bus 90 via the Data signal. When the DSDI signal and the Drive External Reset Configuration (Group D) signals are asserted, each of data bits D22 through D31 are provided to system integration unit 20 via Data bus 90. Thus, bits D22 through D31 are provided as data bits twenty-two through thirty-one of the external configuration data value.

However, if data bit D21 is negated, the Drive External Reset Configuration (Group D) is negated. When the Drive External Reset Configuration (Group D) signal is provided to each of data bits D22 through D31, inverter 212 inverts the signal to enable buffer 208 to provide a corresponding data bit stored in default reset configuration value latch 210 to buffer 206. Buffer 206 is enabled to provide the corresponding data bit to an internal bus via the Data signal (ID22 through ID31) when AND gate 204 provides an asserted output in response to the negated Has Configuration signal. Additionally, because the Drive External Reset Configuration signal is a logic zero value, buffer 214 is not enabled to provide data stored in data latch 216 to external bus interface 120 of data processor 10. Because the Drive External Reset Configuration (Group D) signal is provided to each of data bits D22 through D31, data stored in a default reset configuration value latch 210 of each of data bits D22 through D31 is provided as a corresponding bit of a default data configuration value. As previously mentioned, in the present embodiment of the invention, the default reset configuration value latch is implemented as a non-volatile memory.

Operation of the present invention is summarized in a flow chart illustrated in FIG. 6. In a first step 300, the Reset In signal or an internal reset signal is asserted. In response to the assertion of either the Reset In or internal reset signals, reset control circuit 140 provides a Reset Out signal in a step 302. Data processor 10 then waits for five clock cycles in a step 304. Note that in an alternate embodiment of the invention, more, less, or no clock cycles may be required. In a step 306, a DSDI signal provided by the DSDI integrated circuit terminal and the data values provided to the plurality of integrated circuit terminals of data processor 10 are latched in a latch such as data latch 216 of FIG. 5.

If the DSDI signal is negated (not equal to one) (Step 308), data processor 10 tests to determine if an internal memory of data processor 10 has a data configuration value (Step 324). The internal memory of data processor 10 includes L bus internal non-volatile memory 30 and I bus internal non-volatile memory 60. If no internal memory stores the data configuration value, external bus interface 120 of system integration unit 20 drives a default configuration data value to a remaining portion of data processor 10 (Step 323).

If an internal memory does store the data configuration value, L bus interface 180 determines if the L Has Configuration signal in asserted (Step 328). If the L Has Configuration signal is asserted, L bus interface 180 asserts the L Bus Drive Configuration signal (Step 338). When the L Bus Drive Configuration signal is asserted, L bus internal non-volatile memory 30 provides a configuration data value stored in configuration data register 32 to L bus 70 via the L Bus Data signal (Step 340). Subsequently, the configuration data value is provided to all internal busses of data processor 10 (Step 342).

If L bus interface 180 determines that the L Has Configuration is negated, L bus interface 180 determines if the I Has Configuration signal has been asserted (Step 330). If the I Has Configuration signal is negated, there is an error (Step 332). However, if the I Has Configuration signal is asserted, I bus interface 170 asserts the I Bus Drive Configuration signal (Step 334). When the I Bus Drive Configuration signal is asserted, I bus internal non-volatile memory 60 provides a configuration data value stored in configuration data register 62 to I bus 80 via the I Bus Data signal (Step 336). Subsequently, the configuration data value is provided to all internal busses of data processor 10 (Step 342).

Additionally, if the DSDI signal is asserted, external bus interface 120 retrieves data latched at the integrated circuit terminals corresponding to data bits D0 through D5. If data bit D5 is a logic low value, external bus interface 120 provides bits six through 31 from a default configuration data value stored therein (Step 310). If data bit D5 is a logic high value (Step 312), data bits D6 through D13 are retrieved from the integrated circuit terminals of data processor 10 (Step 314). If data bit D13 is a logic low value, external bus interface 120 provides bits fourteen through 31 from the default configuration data value stored therein (Step 314). If data bit D13 is a logic high value (Step 316), data bits D14 through D21 are retrieved from the integrated circuit terminals of data processor 10 (Step 318). If data bit D21 is a logic low value (Step 318), external bus interface 120 provides bits 22 through 31 from the default configuration data value stored therein (Step 318). If data bit D21 is a logic high value (Step 320), data bits D22 through D31 are retrieved from the integrated circuit terminals of data processor 10 (Step 322). Subsequently, the configuration data value is provided to all internal busses of data processor 10 (Step 342).

In summary, the present invention provides a data processing system which allows an external user to determine a reset configuration in a flexible manner. When the data processing system is reset, a reset configuration may be determined by either an external configuration value provided to a plurality of external integrated circuit pins or an internal value stored in an internal memory of the data processing system. Additionally, if an external configuration value is not provided and if an internal value is not stored in the internal memory, the data processing system of the present invention provides a default configuration value. The default configuration value is stored in a memory in an system integration unit of the data processing system.

The combined use of a default value, configuration data stored in the internal memory, and the ability to receive configuration data via external integrated circuit pins makes the present invention more cost effective than prior art implementations. For example, high volume users may store configuration data in the internal memory to eliminate external circuitry required to drive configuration data during execution of a reset operation. Therefore, the cost of the data processing system may be significantly reduced.

The present invention also allows the data processor to be selectively configured to the default configuration and any other configuration which may be required for testing purposes or any other operation which requires the default configuration to be overridden. The selectivity embodied by the data processor implementing the present invention is especially useful for low volume users who can not afford the expense of having a manufacturer design a data processor tailored to their specifications. Additionally, the ability of the present invention to selectively configure the data processor is useful for those users who want to use existing data processors as prototypes or for system development.

Additionally, in another unique feature of the present invention, the configuration data is retrieved from the external integrated circuit pins in a grouping of eight bits referred to as an octal packet. A last bit of each of the octal packets determines whether a next eight bits of the configuration data is to be retrieved via the plurality of integrated circuit pins or to be retrieved from the default configuration value stored in the system integration unit of the data processing system. This feature also provides substantial cost savings for users whose application only slightly varies from the default reset configuration. By providing external devices for driving the changed bit values only onto the associated integrated circuit pins, overhead costs associated with providing such external devices are reduced from those of traditional implementations which require external devices for all bits of the configuration data value.

The implementation of the invention described herein is provided by way of example only. However, many other implementations may exist for executing the function described herein. For example, the reset input to data processor 10 may be provided by any number of sources used to reset operation of data processing system 10. Additionally, L bus internal non-volatile memory 30 and I bus internal non-volatile memory 60 may be implemented using any type of nonvolatile memory. Such memories include ROM, EEPROM, and flash EEPROM. Furthermore, in the present embodiment of the invention, when a portion of the configuration data value is provided by the default data configuration value stored in system integration unit 10, all subsequent portions of the data configuration value should also be provided by the default data configuration value in system integration unit 10. Note that in an alternate embodiment of the present invention, subsequent portions of the data configuration value may be provided by an external device such as external device 100. Furthermore, in another alternate embodiment of the present invention, note that no internal nonvolatile memories may be implemented. In that case, a default value stored in default latch or an external value provided by the plurality of integrated circuit terminals would provide the reset configuration data value.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

I claim:

1. A data processing system, comprising:
   a first memory for storing a first valid bit and a first configuration data value, the first memory providing the first configuration data value as a reset system configuration value when a first drive configuration signal is in a first logic state;
   a first interface circuit coupled to the first memory for receiving the first valid bit and the first configuration data value and for providing the first drive configuration signal, the first interface circuit providing an internal configuration indication signal and receiving an internal drive configuration signal; and
   an external bus interface which selectively communicates an external configuration data value, the external bus interface being coupled to the first interface circuit for receiving the internal configuration indication signal, the external bus interface generating the internal drive configuration signal in response to a mode select signal and the internal configuration indication signal, and the external bus interface providing an external configuration data value as the reset system configuration value when the mode select signal is in a second logic state.

2. The data processing system of claim 1 wherein the reset system configuration value configures the data processing system to operation in a preselected mode of operation after a reset signal is asserted.

3. The data processing system of claim 2, further comprising:
   a reset circuit for generating the reset signal, the reset circuit being coupled to the external bus interface for receiving an external reset signal from a source external to the data processing system.

4. The data processing system of claim 1 wherein the external bus interface further comprises:
   a plurality of integrated circuit terminals for communicating an external data value;
   a plurality of bit slices for storing a default data value; and
   a drive logic circuit coupled to the first interface circuit for receiving the internal configuration indication signal, the drive logic circuit generating the internal drive configuration signal in response to the mode select signal and the internal configuration indication signal, the drive logic circuit generating a first drive external reset configuration signal to enable a first portion of the plurality of bit slices to provide one of a first portion of the default data value and a first portion of the external data value as a first portion of the external configuration data value.

5. The data processor of claim 4 wherein the first portion of the plurality of bit slices provides the first portion of the default data value as the first portion of the external configuration data value when the first drive external reset configuration signal is in a third logic state.

6. The data processor of claim 4 wherein the default data value is stored in a mask programmable read only memory.

7. The data processor of claim 4 wherein a predetermined bit of the first portion of the default data value provides a second drive external reset configuration signal to enable a second portion of the plurality of bit slices to provide one of a second portion of the default data value and a second portion of the external data value as a second portion of the external configuration data value.

8. The data processor of claim 7 wherein the predetermined bit is a last bit of the first portion of the default data value.

9. The data processor of claim 7 wherein the second portion of the plurality of bit slices provides the second portion of the external data value as the second portion of the external configuration value when the first portion of the plurality of bit slices provides the first portion of the external data value as the first portion of the external configuration value.

10. The data processor of claim 7 wherein a remaining portion of the plurality of bit slices provides a remaining portion of the external data value as a remaining portion of the external configuration value when the first portion of the plurality of bit slices provides the first portion of the external data value as the first portion of the external configuration data value.

11. The data processor of claim 1 further comprising:
   a second memory for storing a second valid bit and a second configuration data value, the second memory providing the second configuration data value as the reset system configuration value when a second drive configuration signal is in a third logic state.

12. The data processor of claim 11 further comprising:
   a second interface circuit coupled to the second memory for receiving the second valid bit and the second configuration data value and for providing the second drive configuration signal, the second interface circuit providing the second drive configuration signal and the second valid bit to the first interface circuit to selectively enable the first interface circuit to provide the internal configuration indication signal.

13. The data processor of claim 12 wherein the first interface circuit provides the first configuration data value when both the first drive configuration signal and the second drive configuration signal are asserted.

14. A method for configuring a data processor, comprising the steps of:
   i. asserting a reset signal;
   ii. retrieving a mode select signal;
   iii. providing a first configuration signal to indicate if a first valid internal configuration value is stored in a first memory circuit;
   iv. generating an internal configuration signal in response to the first configuration signal;
   v. generating a first drive external reset configuration signal in response to the mode select signal and the reset signal;
   vi. generating an internal drive configuration signal to indicate when the first memory circuit should provide the first valid internal configuration signal as a reset configuration value, the internal drive configuration signal being generated in response to the first configuration signal and the first drive external reset configuration signal; and
   vii. enabling an external bus interface circuit to provide a first portion of an external data value as a first portion of the reset configuration value when the internal drive configuration signal is in a first logic state.

15. The method of claim 14 further comprising the step of:
   viii. accessing a first portion of a plurality of integrated circuit terminals to retrieve the first portion of the external data value when the first drive external reset configuration signal is in a second logic state and the internal drive configuration signal is in the first logic state.

16. The method of claim 15 further comprising the step of:
   ix. accessing a remaining portion of the plurality of integrated circuit terminals to retrieve a remaining portion of the external data value when the first portion of the plurality of integrated circuit terminals is accessed to retrieve the first portion of the external data value.

17. The method of claim 15 further comprising the step of:
   ix. accessing a first portion of a default value stored in a default memory as the first portion of the external data value when the first drive external reset configuration signal is in a third logic state and the internal drive configuration signal is in the first logic state.

18. The method of claim 17 wherein the default memory is a mask programmable read only memory.

19. The method of claim 15, further comprising the steps of:
   ix. accessing a last bit of a first data value provided by the first portion of the plurality of integrated circuit terminals;
   x. providing the last bit of the first data value as a second drive external reset configuration signal; and
   xi. accessing a second portion of the plurality of integrated circuit terminals to retrieve a second portion of the external data value when the second drive external reset configuration signal is in a second logic state and the internal drive configuration signal is in the first logic state.

20. The method of claim 19 further comprising the step of:

x. accessing a remaining portion of the plurality of integrated circuit terminals to retrieve a remaining portion of the external data value when the second portion of the plurality of integrated circuit terminals is accessed to retrieve the second portion of the external data value.

21. The method of claim 19 further comprising the step of:

x. accessing a second portion of a default value stored in a default memory as the second portion of the external data value when the second drive external reset configuration signal is in a third logic state and the internal drive configuration signal is in the first logic state.

22. The method of claim 14 further comprising the steps of:

providing a second configuration signal to indicate if a second valid internal configuration value is stored in a second memory circuit; and generating the internal configuration signal in response to the second configuration signal.

23. The method of claim 22 further comprising the step of: providing the first valid internal configuration signal as the reset configuration value when both the first configuration signal and the second configuration signal are asserted.

24. A data processing system, comprising:

a plurality of integrated circuit terminals for communicating an external data value;

a mode select integrated circuit terminal for receiving a mode select signal;

a plurality of bit slices for storing a default data value; and a drive logic circuit for generating an internal drive configuration signal in response to the mode select signal, the drive logic circuit generating a first drive external reset configuration signal to enable a first portion of the plurality of bit slices to provide one of a first portion of the default data value and a first portion of the external data value as a first portion of a reset configuration data value, wherein a predetermined bit of the first portion of the default data value provides a second drive external reset configuration signal to enable a second portion of the plurality of bit slices to provide one of a second portion of the default data value and a second portion of the external data value as a second portion of the reset configuration data value.

25. The data processor of claim 24 wherein the default data value is stored in a mask programmable read only memory.

26. The data processor of claim 24 wherein the predetermined bit is a last bit of the first portion of the default data value.

27. The data processor of claim 24 wherein the second portion of the plurality of bit slices provides the second portion of the external data value as the second portion of the reset configuration value when the first portion of the plurality of bit slices provides the first portion of the external data value as the first portion of the reset configuration value.

28. The data processor of claim 24 wherein a remaining portion of the plurality of bit slices provides a remaining portion of the external data value as a remaining portion of the reset configuration value when the first portion of the plurality of bit slices provides the first portion of the external data value as the first portion of the reset configuration data value.

* * * * *